(12) United States Patent
Austin et al.

(10) Patent No.: US 7,012,803 B1
(45) Date of Patent: Mar. 14, 2006

(54) COMPUTER SYSTEM HAVING HARD DRIVE LATCHING MECHANISM

(75) Inventors: Peter W. Austin, Spring, TX (US); Arthur K. Farnsworth, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 09/717,555

(22) Filed: Nov. 21, 2000

(51) Int. Cl.
*G06F 1/16* (2006.01)

(52) U.S. Cl. ..................................................... 361/685
(58) Field of Classification Search ......... 361/683–686
See application file for complete search history.

(56) References Cited

U.S. PATENT DOCUMENTS

| | | | | |
|---|---|---|---|---|
| 5,112,119 A | * | 5/1992 | Cooke et al. | 312/283 |
| 5,539,616 A | * | 7/1996 | Kikinis | 361/686 |
| 5,726,922 A | * | 3/1998 | Womble et al. | 361/726 |
| 6,442,021 B1 | * | 8/2002 | Bolognia et al. | 361/685 |

\* cited by examiner

*Primary Examiner*—Yean-Hsi Chang (57) ABSTRACT

A computer system having a hard drive securing system. The hard drive securing system is operable to secure one or more hard drives to a chassis with a single operator. The hard drive securing system uses a plurality of hard drive guides, a hard drive carrier, and a securing lever to secure a plurality of hard drives to a chassis without the use of tools.

33 Claims, 7 Drawing Sheets

FIG. 13

COMPUTER SYSTEM HAVING HARD DRIVE LATCHING MECHANISM

FIELD OF THE INVENTION

The present invention relates generally to a computer system having a computer hard drive, and particularly to a system for securing one or more computer hard drives to a computer chassis with a single actuator and without the use of tools.

BACKGROUND OF THE INVENTION

A computer system is typically comprised of a variety of different devices, such as a monitor, keyboard, and mouse, connected to a central unit, commonly referred to as the computer. Typically, the computer houses a variety of components within a protective enclosure. For example, a typical computer has one or more hard drives for permanently storing data, such as computer programs. A typical computer also has a central processing unit, or CPU, that controls the operation of the computer in accordance with the computer programming stored in the hard drive. The computer uses temporary memory, or RAM, to transfer data between the hard drive and CPU. The computer also has a power supply to supply power to the hard drive, CPU and RAM.

Securing mechanisms that do not require the use of a tool have been used to secure a hard drive to a computer. Typically, these mechanisms secure the hard drive with guides and an actuator drive, such as a flexible strip with a hole. During the installation process, the hard drive is inserted into the guides. The flexible strip is flexed out of its normal position by the hard drive during installation. When installed, the flexible strip returns to its normal position such that the hole in the flexible strip fits over a screw head on the hard drive, preventing the removal of the hard drive from the guides. To remove the hard drive, a force must be applied to bend the flexible strip so that it does not obstruct the movement of the hard drive and the hard drive can be removed from the guides.

Therefore, it would be advantageous to have a system that would allow a computer hard drive to be installed and removed, without the use of tools, with no loose parts produced, and without the need for a bending force to be applied during the removal of the hard drive.

It also would be advantageous to have a system that could allow more than one computer hard drive to be installed and removed with a single actuator, without the use of tools, and with no loose parts produced.

SUMMARY OF THE INVENTION

According to one aspect of the present invention, a computer system having a chassis, a processor, a hard drive securing mechanism, and at least one hard drive is featured. The hard drive securing mechanism is operable to secure one or more hard drives to the chassis with a single actuator. The hard drive is coupled to the processor and secured to the chassis by the hard drive securing mechanism.

According to another aspect of the present invention, a computer hard drive securing system having a chassis, a plurality of guides secured to the chassis, a hard drive carrier and a securing lever is featured. The securing lever is operable to secure one or two hard drives to the chassis in cooperation with the plurality of guides and the hard drive carrier. The carrier is configured to support a computer hard drive.

According to another aspect of the present invention, a method of securing a plurality of hard drives to a computer chassis is featured. The method includes disposing a first hard drive between a first restraint and the securing lever. The method further includes the act of disposing a second hard drive between a second restraint and the carrier. Additionally, the method includes rotating the securing lever to secure the first hard drive and the second hard drive. The first hard drive is secured by the first restraint and the lever, and the second hard drive is secured by the carrier and the second restraint.

According to another aspect of the present invention, a rotatable lever for securing a hard drive to a chassis is featured. The rotatable lever has a plurality of guides. The guides are configured to receive a protruding member when the securing lever is in a first position and to restrict the protruding member when the securing lever is in a second position.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
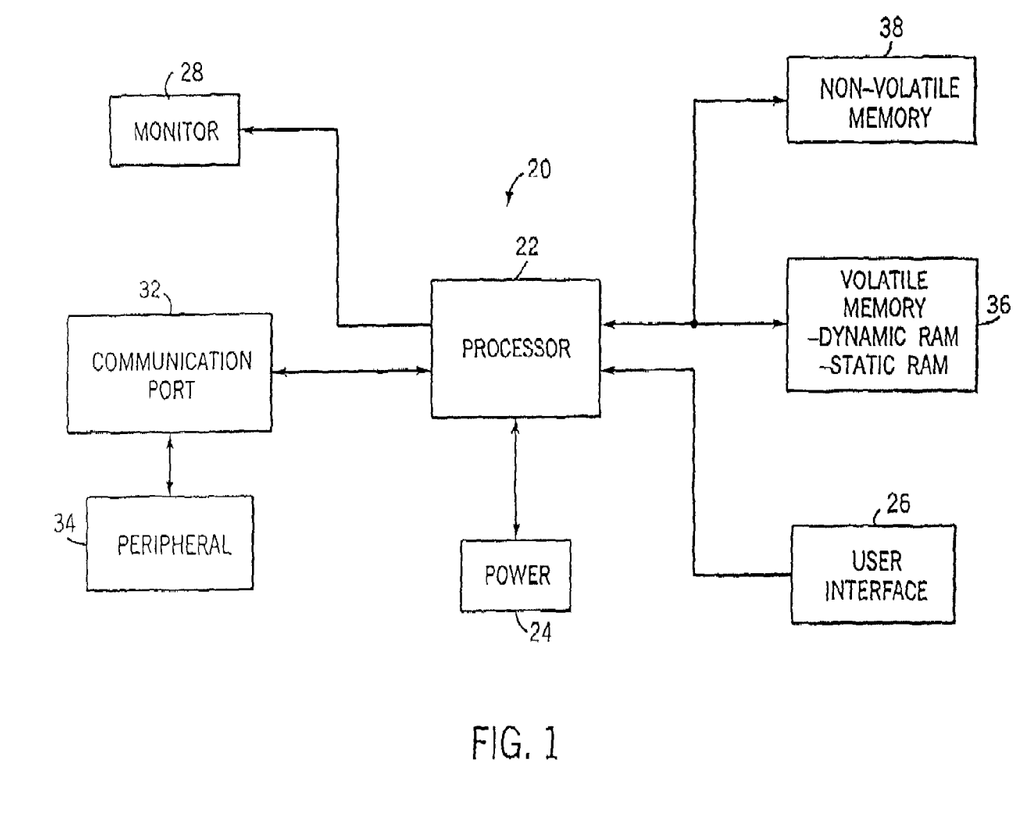
FIG. 1 is a block diagram of a computer system.

Referring generally to FIG. 1, a block diagram depicting an exemplary computer system, generally designated by the reference numeral 20, is featured.

Computer 20 may be any of a variety of different types, such as a server, desktop computer, or workstation. In the illustrated embodiment, a processor 22 controls the functions of computer system 20. Computer 20 also includes a power supply 24 to supply power to various components within the system 20.

Various other devices may be coupled to processor 22, depending upon the desired functions of computer 20. For example, a user interface 26 may be coupled to processor 22. Examples of user interfaces 26 include buttons, switches, a keyboard, a light pen, a mouse, and/or a voice recognition system. A display 28 may also be coupled to processor 22. Examples of displays 28 include: a television screen, a computer monitor, LEDs, or even an audio display. Additionally, a communications port 32 may be coupled to processor 22. Communications port 32 may be adapted to be coupled to a peripheral device 34, such as a printer, a computer or an external modem.

Typically, processor 22 utilizes programming to control the operation of computer 20. Memory is coupled to processor 22 to store and facilitate execution of the programming. In the illustrated embodiment, processor 22 is coupled to a volatile memory 36 and two hard drives utilized as non-volatile memory. The present hard drive latching system, discussed below, is particularly amenable to securing two hard drives. Non-volatile memory 38 also may include a high capacity memory such as a disk or tape drive memory. Non-volatile memory 38 may include a read only memory (ROM), such as an EPROM, to be used in conjunction with volatile memory 36. A variety of memory modules, such as DIMMs, DRAMs, SDRAMs, SRAMs, etc. also may be utilized as volatile memory 36 for a given device.

Figure 2:
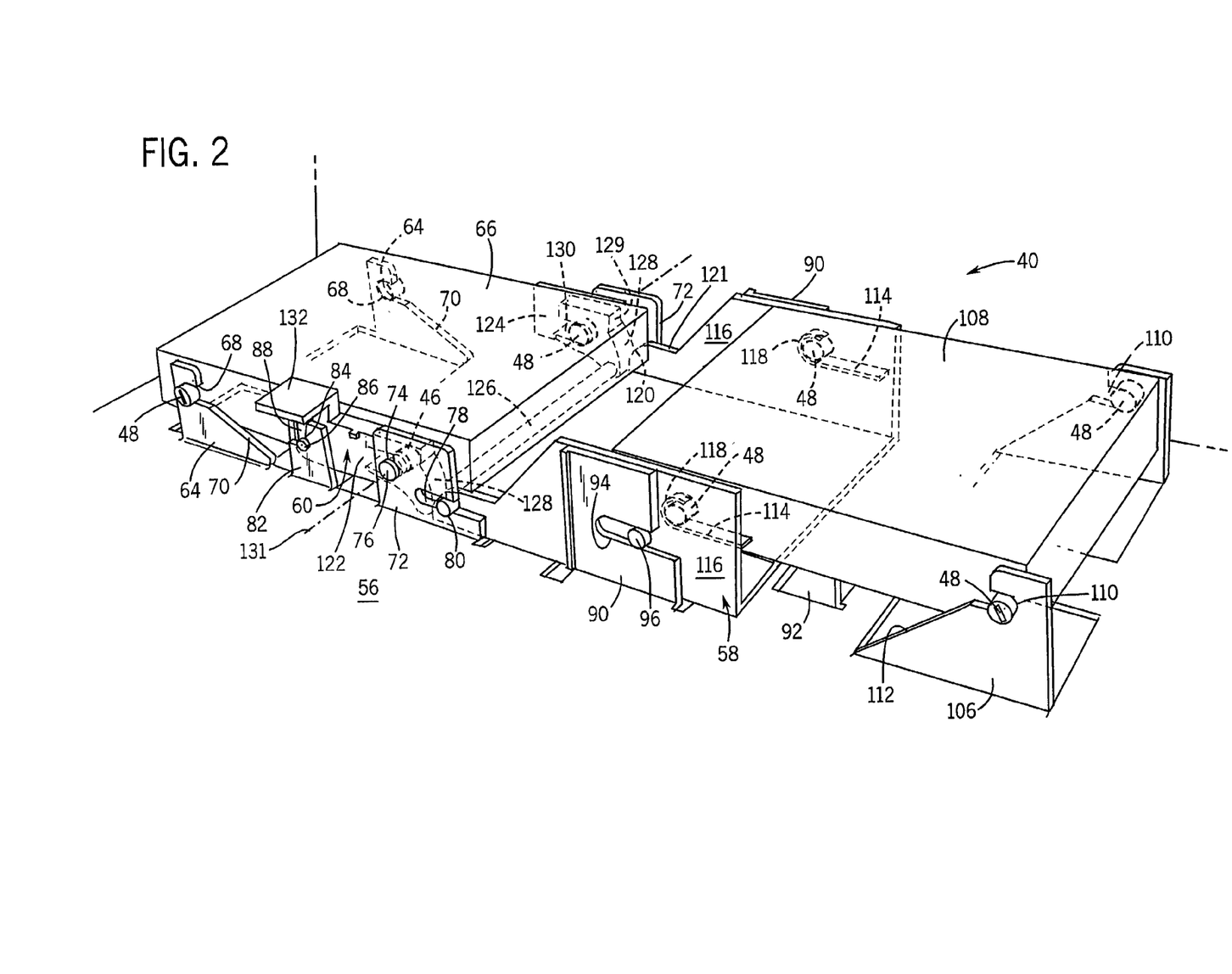
FIG. 2 is a perspective view of a computer chassis having a hard drive latching mechanism securing two hard drives to the chassis with a single actuator, according to a preferred embodiment of the present invention.
Figure 3:
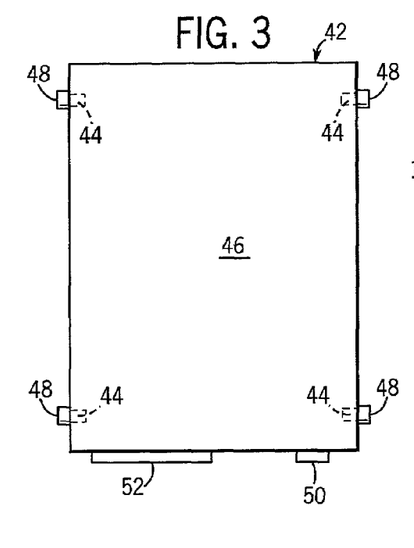
FIG. 3 is a top view of a computer hard drive.

Referring generally to FIG. 2, an exemplary embodiment of a hard drive latching system or securing mechanism 40 is illustrated. In the illustrated embodiment, hard drive latching system 40 can secure one or two hard drives. As best illustrated in FIG. 3, each hard drive 42 has a plurality, e.g. four, support members 44, such as screws threaded into the body 46 of the hard drive. Each screw 44 has an extending head 48. Each hard drive 42 also has a power connector 50 for coupling power to the hard drive and a data connector 52 for transferring data to and from hard drive 42.

Referring again to FIG. 2, the illustrated embodiment of hard drive latching system 40 can be operated to secure one or two hard drives. Hard drive latching system 40 includes a plurality of tabs formed in chassis 56, a carrier 58, and a securing lever system or securing lever 60.

In the illustrated embodiment, chassis 56 is formed of sheet metal. The tabs are formed by cutting patterns in sheet metal portions of chassis 56 and performing a series of bending operations to shape the tabs. The tabs are used to restrict and guide the movement of the hard drives, carrier 58 and securing lever 60. Rather than forming a plurality of tabs, a separate guide assembly may be constructed and secured to chassis 56 to perform the same function as the plurality of tabs. Additionally, a single device may be used where multiple tabs are used in consort.

Two first tabs 64 are used to secure a first hard drive 66. Each first tab 64 has a securing notch 68. Securing notch 68 is shaped to restrict motion of heads 48 on a first hard drive 66. Each first tab 64 also has an inclined leading edge 70 to direct a head 48 into proper position in notch 68.

Two second tabs 72 are used to secure carrier 58 and lever 60 to chassis 56. Each second tab 72 has a hole 74 therethrough. In the illustrated embodiment, securing lever 60 has a pin 76 at each end. Securing lever 60 is secured by inserting each pin 76 into a corresponding hole 74 in each second tab 72. The holes 74 and pins 76 allow securing lever 60 to rotate smoothly from an upright to a horizontal position. Each second tab 72 also has a notch 78. Each notch 78 guides a first pin 80 on carrier 58 A third tab 82 is used to secure lever 60. Third tab 82 is shaped to form a catch 84. Lever 60 includes a pin 86 disposed at the end of a flexible member 88. When lever 60 is in the horizontal, or secured position, catch 84 restricts the movement of pin 86.

Figure 4:
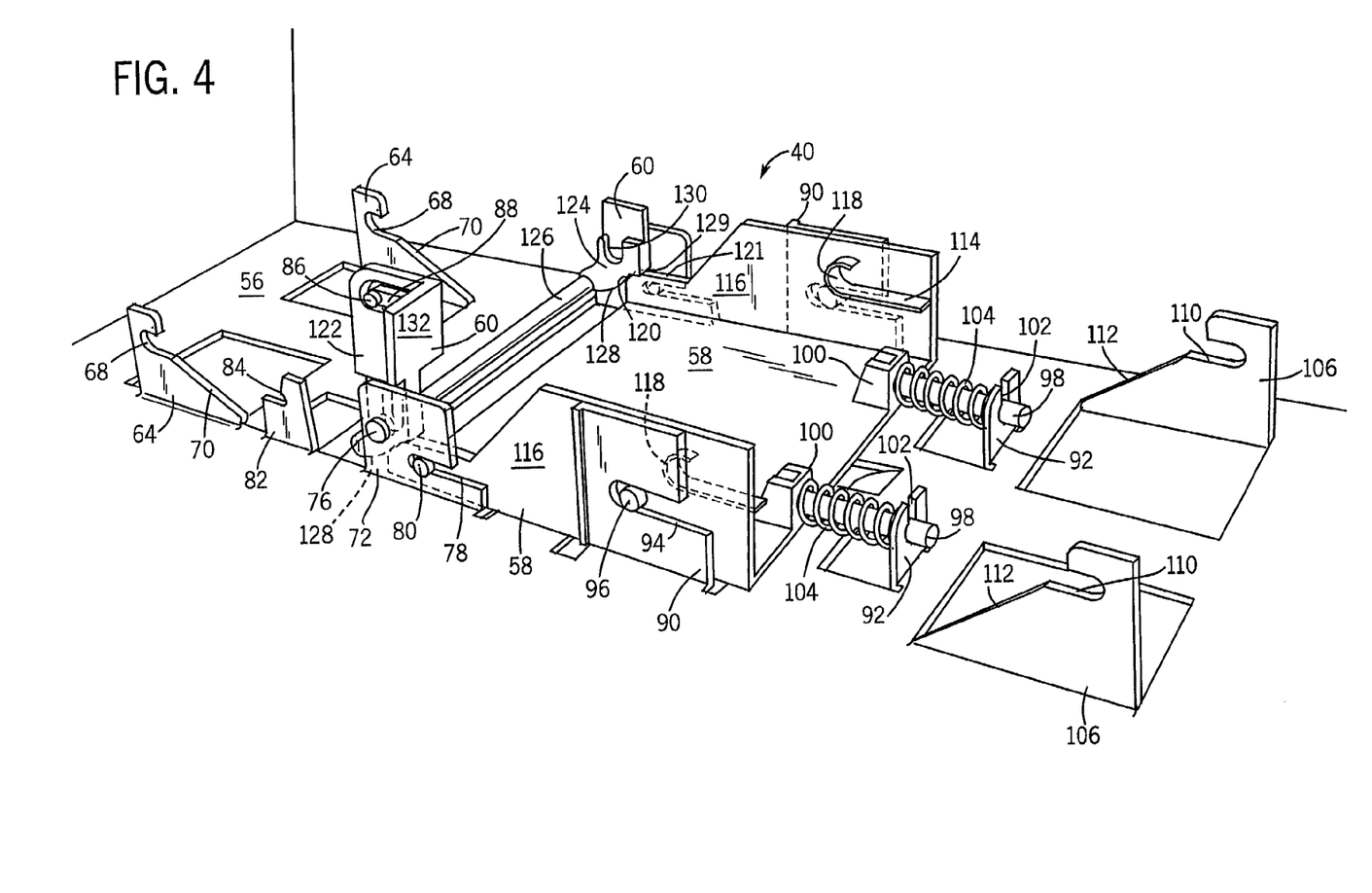
FIG. 4 is a perspective view of the computer chassis of FIG. 2 with the two hard drives removed.

Two fourth tabs 90 and two fifth tabs 92 are used with second tabs 72 to slidingly secure carrier 58 to chassis 56. Each fourth tab 90 has a notch 94 that directs the movement of a second carrier pin 96 on carrier 58. As best illustrated in FIG. 4, carrier 58 also includes two guide rods 98 secured to mounts 100 on carrier 58. Each of the fifth tabs 92 has a notch 102 to direct guide rods 98 as carrier 58 is moved. A spring 104 is inserted over each guide rod 98 between each fifth tab 92 and mount 100. Springs 104 bias carrier 58 towards securing lever 60.

Referring again to FIG. 2, two sixth tabs 106 are used with carrier 58 to secure a second hard drive 108. Each sixth tab 106 has a notch 110 to restrict motion of a head 48 on second hard drive 108. Each sixth tab 106 also has an inclined edge 112 to direct second hard drive 108 into proper securing position.

Carrier 58 has two guide rails 114 along sides 116 of carrier 58. Each guide rail 114 supports a head 48 on second hard drive 108. Each guide rail 114 includes a curved end 118 configured to restrict a head 48 on second hard drive 108 when the latch mechanism is operated. Carrier 58 also has a curved end 120 configured for engagement with lever 60. Curved end 120 also has a flat portion 121.

Securing lever 60 has an actuator end 122 and a distal end 124 connected by a rod 126. Actuator end 122 and distal end 124 have a cam 128 configured for sliding engagement with curved end 120 of carrier 58 and a flat portion 129 configured to engage flat portion 121 of curved end 120 when lever 60 is in a vertical position, thus acting to stop further movement of lever 60 past vertical. Cam surface 128 forces curved end 120 towards fifth tabs 92 as lever 60 is rotated counterclockwise from an upright to a horizontal position.

Actuator end 122 and distal end 124 each include a tapered notch 130. Each tapered notch 130 is designed to guide a head 48 of first drive 66 into a proper position in securing lever 60. Each tapered notch 130 is configured so that heads 48, hole 74, and pin 76 are aligned along an axis 131. Lever 60 also includes a tab 132 to facilitate manual rotation of lever 60.

Figure 5:
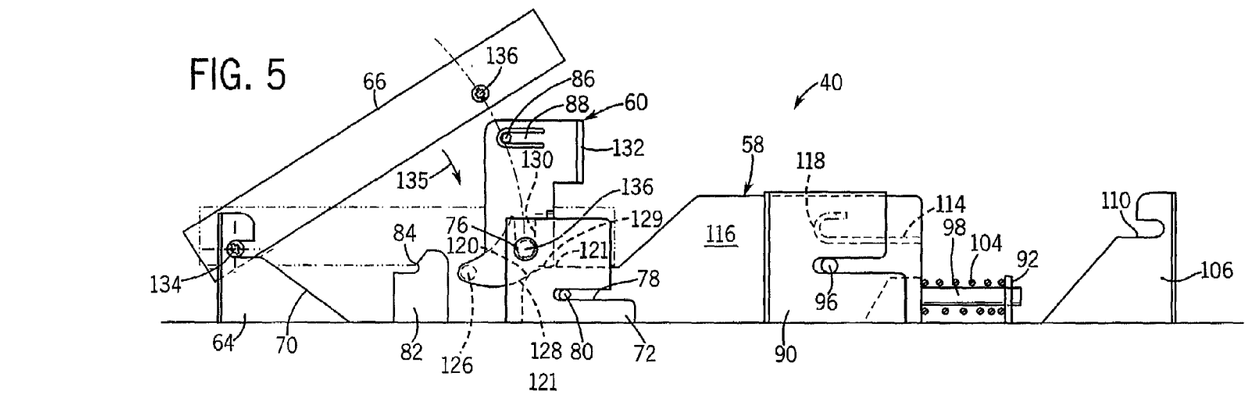
FIG. 5 is a front elevational view of the hard drive latching system of FIG. 4, illustrating the installation of a first hard drive into the hard drive latching mechanism, according to a preferred embodiment of the present invention.

Referring generally to FIGS. 5 through 9, the process of securing hard drives 66 and 108 in chassis 56 is illustrated. Referring generally to FIG. 5, first hard drive 66 is initially positioned with first heads 134 of heads 48 inserted into notches 68 of first tabs 64 to install first hard drive 66 in latching system 40. First hard drive 66 is then pivoted towards securing lever 60, as referenced by arrow 135, such that second heads 136 of heads 48 are inserted into tapered notch 130. The taper of each notch 130 guides each heads 136 into position.

Figure 6:
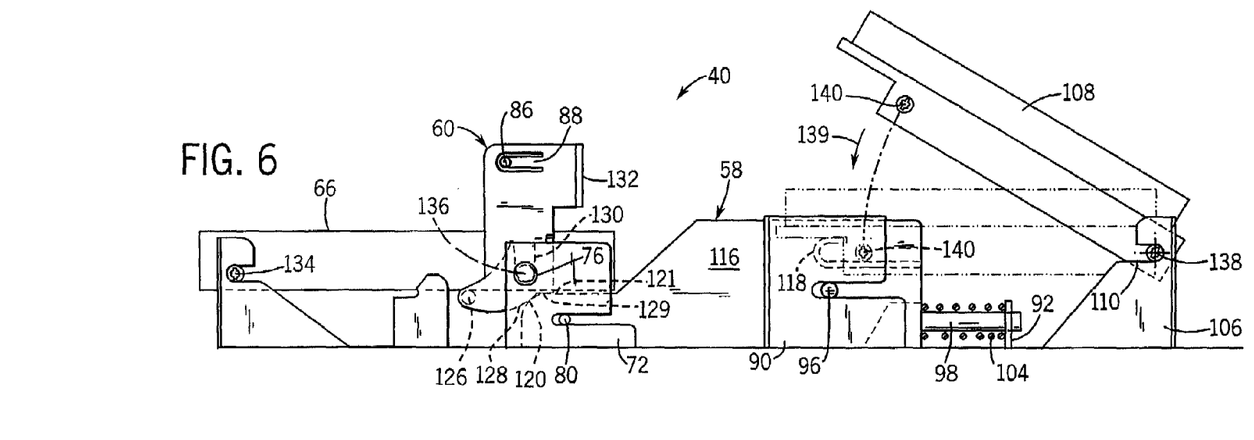
FIG. 6 is a front elevational view of the hard drive latching system of FIG. 5, illustrating the installation of a second hard drive into the hard drive latching mechanism.

Referring generally to FIG. 6, to install second hard drive 108 into hard drive latching system 40, second hard drive 108 is initially positioned with leading heads 138 of heads 48 inserted into notches 110 of sixth tabs 106. Second hard drive 108 is then pivoted towards carrier 58, as referenced by arrow 139, such that trailing screw heads 140 of heads 48 are placed on rail 114.

Figure 7:
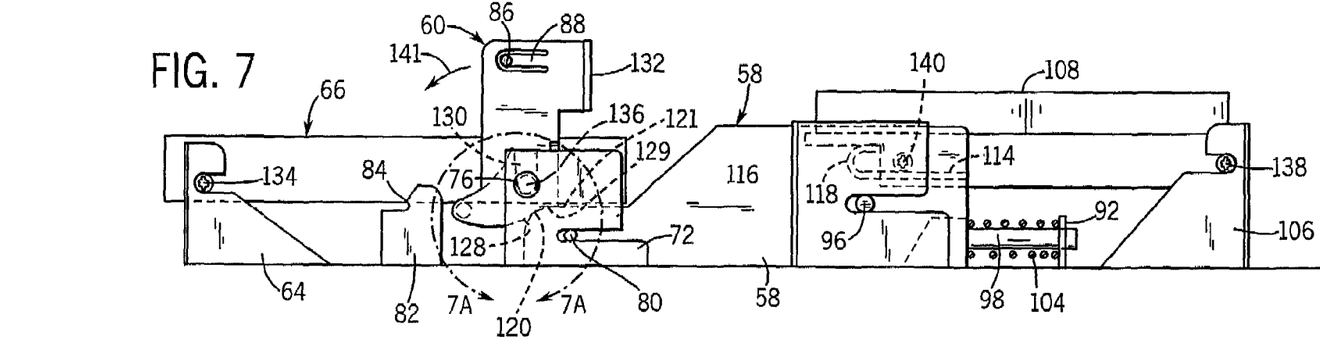
FIG. 7 is a front elevational view of the computer chassis of FIG. 6, illustrating two hard drives positioned within the hard drive latching system with the securing lever in an upright position.
Figure 7A:
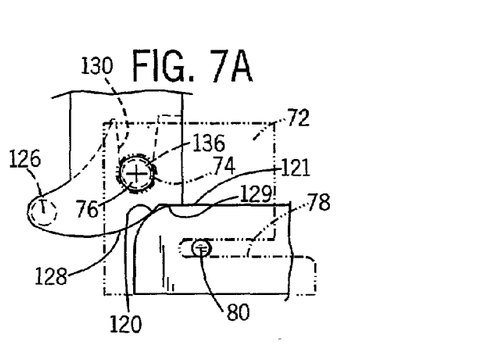
FIG. 7A is an expanded view of the cam of the lever and a curved end of a carrier, taken generally along line 7A—7A of FIG. 7.

Referring generally to FIG. 7, to secure hard drives 66 and 108, lever 60 is rotated from the upright position to a horizontal position, as referenced by arrow 141. As best illustrated in FIG. 7A, second heads 136 are unsecured by lever 60 when lever 60 is in the upright position. At this stage, hard drive 66 may be lifted and removed from hard drive latching system 40.

Figure 8:
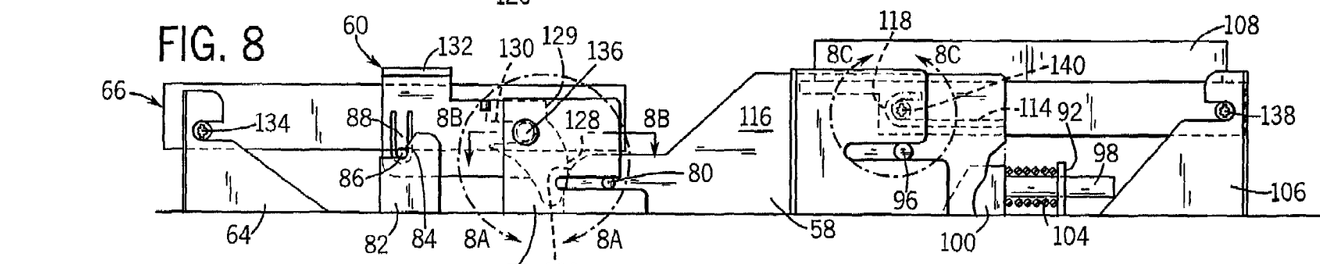
FIG. 8 is a front elevational view of the computer chassis of FIG. 6, illustrating two hard drives positioned within the hard drive latching system with the securing lever in a horizontal, or secured, position.
Figure 8A:
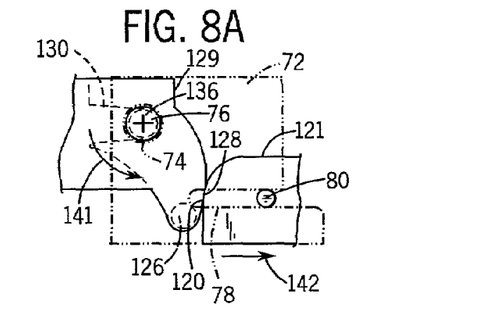
FIG. 8A is an expanded view of the cam of the lever and a curved end of a carrier, taken along line 8A—8A of FIG. 8.

Referring generally to FIGS. 8 and 8A, hard drives 66 and 108 are secured in hard drive latching system 40 when lever 60 is in the horizontal position. As best illustrated in FIG. 8A, each tapered notch 130 of lever 60 is rotated about a respective second head 136 as lever 60 is rotated from the upright position to the horizontal position. Thus, first and second heads 134 and 136 are secured between notches 68 on first tabs 64 and tapered notches 130 on lever 60. Pin 86 on flexible member 88 is captured by catch 84 on third tab 82 when lever 60 rotated to the horizontal position. Tab 132 is provided for an operator to easily manipulate lever 60.

Figure 8B:
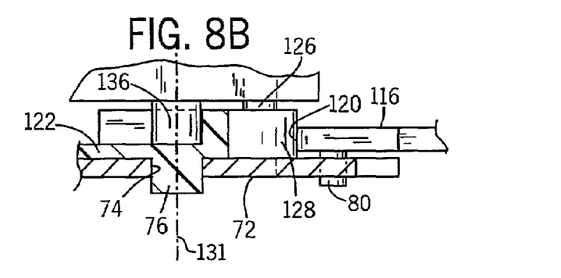
FIG. 8B is a cross-sectional view illustrating a securing lever, carrier, and a tab, taken along line 8B—8B of FIG. 8.

As illustrated in FIG. 8A, cam 128 of lever 60 slidingly engages curved end 118 of carrier 58 as lever 60 is rotated counterclockwise. The shape of cam 128 causes carrier 58 to be driven linearly to the right, in this view, as illustrated by arrow 142. A top view of the orientation of carrier 58, lever 60, and second tabs 72 at the point of engagement is illustrated in FIG. 8B.

Figure 8C:
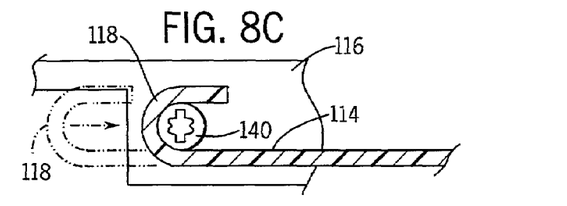
FIG. 8C is an expanded view of a curved end of a carrier and a hard drive head, taken along line 8C—8C of FIG. 8.

Referring again to FIG. 8, the rotating motion of cam 128 is translated into linear motion of carrier 90 as lever 60 is rotated counterclockwise. The linear motion of carrier 58 to the right compresses springs 104. As best illustrated in FIG. 8C, curved ends 118 of carrier 58 move against trailing heads 140 of second hard drive 108 as carrier 58 is moved to the right by lever 60. Leading and trailing heads 138 and 140 are secured between notches 110 on sixth tabs 106 and curved ends 118 of carrier 58 with lever 60 in the horizontal position.

To remove a hard drive, lever 60 is rotated in a clockwise direction. When lever 60 is in an upright, or unsecured position, heads 136 are no longer restrained by tapered notch 130. Thus, first hard drive 66 can be removed from hard drive latching system 40. Additionally, cam 128 is moved towards the left as lever 60 is rotated clockwise. Compressed springs 104 drive carrier 58 to the left, against cam 128, as lever 60 is rotated clockwise. As carrier 58 moves to the left, curved ends 118 also move to the left. Curved ends 118 do not restrain heads 140 when lever 60 is in a fully upright position. At this stage, second hard drive 108 may be removed from system 40.

Figure 9:
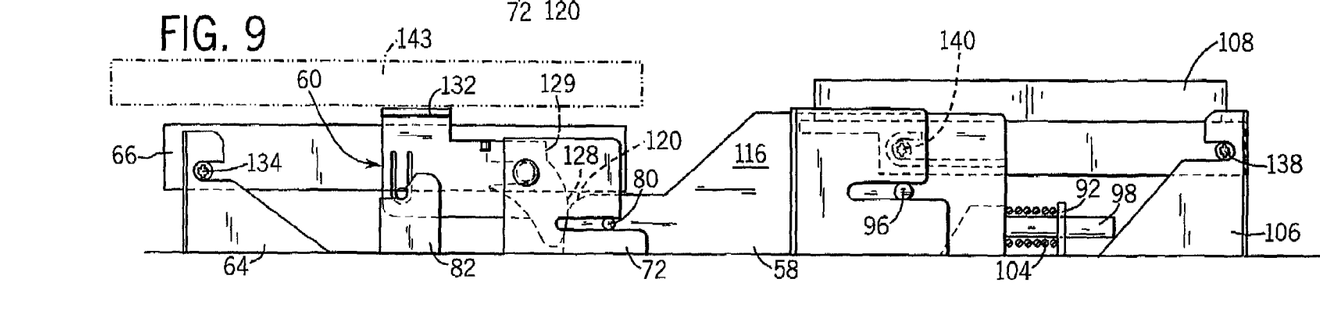
FIG. 9 is a front elevational view of a computer chassis illustrating a shelf disposed over a hard drive, according to a preferred embodiment of the present invention.

Referring generally to FIG. 9, a moveable shelf 143 may be used as a part of chassis 56. Shelf 143 may be used to secure a printed circuit board or some other component. In the illustrated embodiment, shelf 143 is hinged such that it may be lowered over first hard drive 66. Shelf 143 is disposed over tab 132 of lever 60 such that lever 60 can not be rotated clockwise to the upright, or unsecured, position. Thus, assisting hard drive latching system 40 secure the hard drives to chassis 56. Additionally, shelf 143 may not be lowered over hard drive 66 unless rotatable lever 60 is in the horizontal, or secured, position. Thus, shelf 143 acts as a second check to ensure that rotatable lever 60 is in the secured position, securing the hard drives to the chassis, before a assembly of the enclosure cover is completed.

Figure 10:
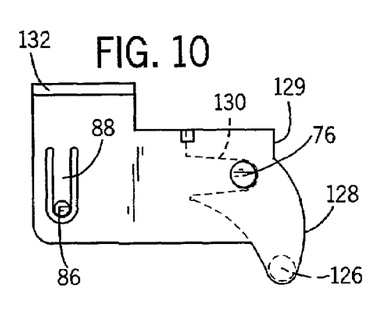
FIG. 10 is a front elevational view of an actuator end of a securing lever, according to a preferred embodiment of the present invention.
Figure 11:
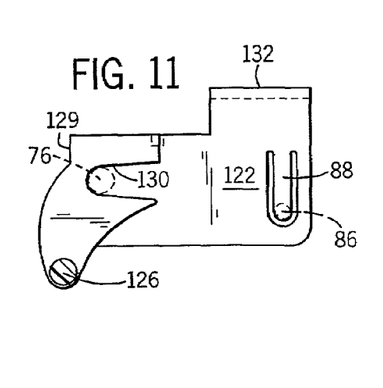
FIG. 11 is a rear elevational view of an actuator end of a securing lever, according to a preferred embodiment of the present invention.
Figure 12:
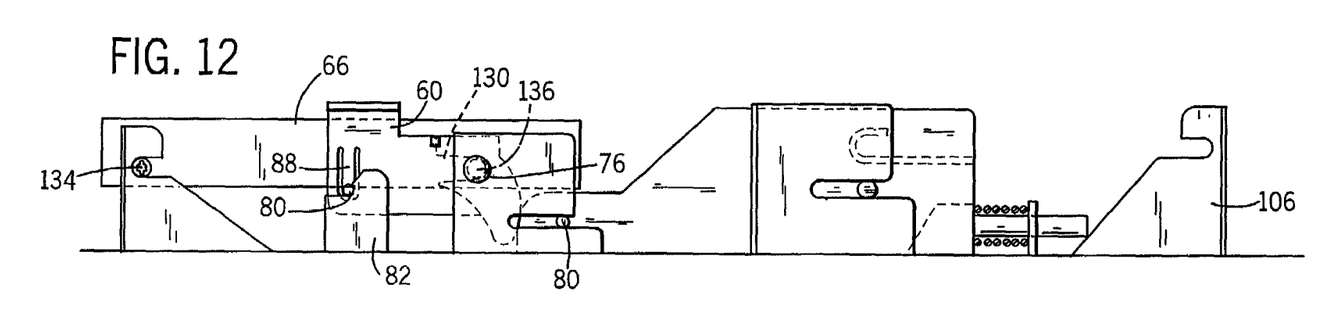
FIG. 12 is a front elevational view of a computer illustrating a single hard drive secured in a hard drive latching mechanism, according to a preferred embodiment of the present invention.

In FIGS. 10 and 11, front and rear views of actuator end 122 of securing lever 60 are illustrated. In FIG. 12, hard drive latching system 40 is illustrated as securing a single hard drive 42 to the chassis. An additional hard drive may be added at a later time.

Figure 13:
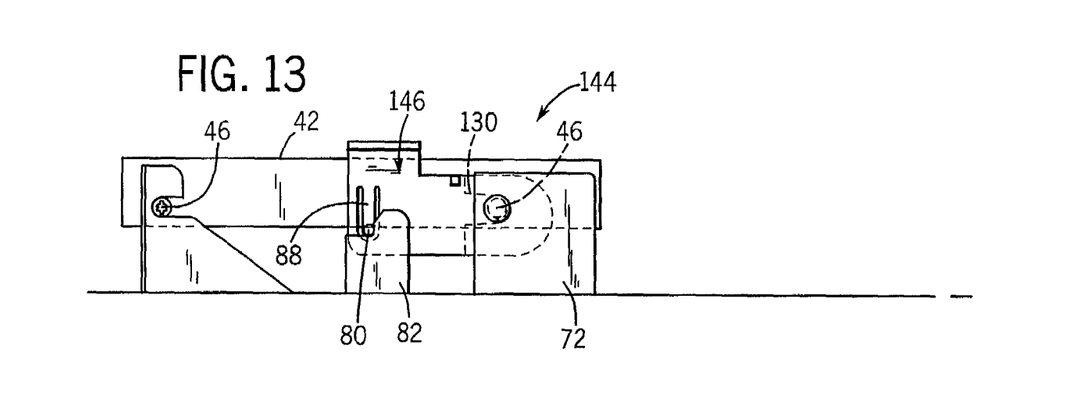
FIG. 13 is a front elevational view of a computer chassis having a hard drive latching mechanism for securing a single hard drive, according to a preferred embodiment of the present invention.

Referring generally to FIG. 13, an exemplary embodiment of a hard drive latching mechanism 144 for securing a single hard drive to the chassis is featured. The operation of hard drive latching mechanism 144 is similar to the operation of hard drive latching mechanism 40. In the illustrated embodiment, a securing lever 146 and a plurality of tabs are used to secure a hard drive 42 to chassis 56. Alternatively, a securing lever 146 and a carrier can be used to secure a single hard drive 42.

It will be understood that the foregoing description is of preferred exemplary embodiments of this invention, and that the invention is not limited to the specific forms shown. For example, devices other than tabs formed in the chassis may be used to restrict the movement of the screw heads of the hard drives, or guide the hard drives. Additionally, a single device secured to the chassis may serve the same purpose as a plurality of tabs. Furthermore, the tabs may be used to restrict the movement of screw heads attached to the hard drive or to fixed portions of the hard drive. These and other modifications may be made in the design and arrangement of the elements without departing from the scope of the invention as expressed in the appended claims.

What is claimed is:

1. A computer system, comprising:
   a chassis;
   a processor;
   a hard drive securing mechanism, the hard drive securing mechanism being operable to secure a plurality of hard drives to the chassis with a rotatable lever, the rotatable lever having a tapered guide configured to receive and secure a protruding member of a hard drive, wherein the tapered guide is further configured to rotate about the protruding member; and
   at least one hard drive secured by the hard drive securing mechanism.

2. The system as recited in claim 1, wherein each hard drive includes a plurality of protruding members, further wherein the hard drive securing mechanism is operable to secure the plurality of hard drives by restricting the movement of the plurality of protruding members.

3. The system as recited in claim 2, wherein a first hard drive is securable between the rotatable lever and a first set of guides.

4. The system as recited in claim 3, wherein a second hard drive is securable between the hard drive carrier and a second set of guides.

5. The system as recited in claim 4, wherein the rotatable lever is operable to drive the carrier towards the second set of guides.

6. The system as recited in claim 5, wherein the rotatable lever comprises a cam configured for sliding engagement with the carrier.

7. The system as recited in claim 6, further comprising a spring, wherein the spring is compressed as the rotatable lever is rotated in a first direction, further wherein the spring biases the carrier towards the rotatable lever when the rotatable lever is rotated in a second direction.

8. The system as recited in claim 7, wherein the rotatable lever comprises a stop that engages a surface on the carrier to prevent rotation of the rotatable lever past the first position as the rotatable lever is rotated in the second direction.

9. The system as recited in claim 8, comprising a moveable obstruction disposable over the rotatable lever, wherein when the moveable obstruction is disposed over the rotatable lever, the moveable obstruction prevents the rotatable lever from rotating from the second position to the first position, and further wherein, when the rotatable lever is disposed in the first position, the rotatable lever prevents the moveable obstruction from being disposed over the rotatable lever.

10. The system as recited in claim 1, the hard drive securing mechanism further comprising:
a plurality of guides secured to the chassis to restrict the movement of a plurality of protruding members; and
a hard drive carrier,
wherein the rotatable lever includes a plurality of tapered guides, each tapered guide being configured to receive and secure a protruding member.

11. The system as recited in claim 10, wherein each tapered guide is configured to receive the protruding member when the rotatable lever is in a first position, further wherein, each tapered guide is configured to prevent movement of the protruding member when the rotatable lever is in a second position.

12. The system as recited in claim 11, wherein the rotatable lever includes a protrusion biased by a flexible member, further wherein the protrusion is captured when the rotatable lever is disposed in the second position.

13. The system as recited in claim 10, wherein the rotatable lever comprises a tab for operating the rotatable lever.

14. The computer system as recited in claim 1, wherein the hard drive securing mechanism is disposed inside the chassis.

15. A hard drive securing system, comprising:
a plurality of guides secured to a chassis;
a hard drive carrier held by a first plurality of guides and configured to support a plurality of hard drives; and
a securing lever mechanism operable to secure the plurality of hard drives to the hard drive carrier, wherein the securing lever mechanism is configured with a cam to drive the hard drive carrier as the securing lever mechanism is rotated from a first position to a second position.

16. The system as recited in claim 15, wherein the securing lever mechanism has a guide portion configured to receive a portion of a hard drive when the securing lever mechanism is in the first position.

17. The system as recited in claim 16, wherein a first hard drive is secured when the securing lever mechanism is rotated to the second position.

18. The system as recited in claim 17, wherein the securing lever mechanism comprises a latch to secure the securing lever mechanism when the securing lever mechanism is in the second position.

19. The system as recited in claim 18, comprising a spring, wherein the spring opposes movement of the hard drive carrier produced by the securing lever mechanism and drives the carrier as the securing lever mechanism is rotated from the first second position to the second position.

20. The system as recited in claim 19, wherein the hard drive carrier is configured to secure a second hard drive against a second plurality of guides when the securing lever mechanism is in the second position.

21. The system as recited in claim 15, wherein the securing lever mechanism is configured to move inside the chassis.

22. A method of securing a plurality of hard drives to a computer chassis, comprising:
disposing a first hard drive between a first restraint and a securing lever by rotating the first hard drive into position between the first restraint and the securing lever;
deploying a second hard drive between a second restraint and a carrier configured to direct the movement of the second hard drive; and
rotating the securing lever to simultaneously secure the first hard drive by the first restraint and the securing lever and the second hard drive by the carrier and the second restraint.

23. The method as recited in claim 22, further comprising:
providing each hard drive with a plurality of protruding members.

24. The method as recited in claim 23, further comprising:
configuring the securing lever with a tapered guide to receive a first plurality of protruding members in a first position of the securing lever and to restrict movement of the first plurality of protruding members in a second position of the securing lever.

25. The method as recited in claim 22, further comprising:
configuring the securing lever with a cam surface to drive the carrier in a first direction as the securing lever is rotated from a first position to a second position.

26. The method as recited in claim 25, further comprising:
providing the chassis with a spring mechanism configured to oppose the movement of the carrier by the securing lever; and
using the spring mechanism to bias the carrier against the securing lever as the securing lever is rotated from the second position to the first position.

27. The method as recited in claim 22, further comprising:
forming the restraints by cutting and bending a portion of the chassis to form a plurality of tabs, each tab configured to restrict the movement of a protruding member.

28. The method as recited in claim 22, wherein rotating the securing lever comprises rotating the securing lever inside the computer chassis.

29. A rotatable lever for securing a hard drive, having a plurality of protruding members, to a chassis, comprising:
a plurality of guides, each guide being configured to receive a protruding member when the rotatable lever is in a first position and to restrict the protruding member when the rotatable lever is in a second position different from the first position.

30. The rotatable lever as recited in claim 29, further comprising:
a first portion including at least one of the plurality of guides;
a second portion including at least a second of the plurality of guides and an operator; and
a connector, connecting the first and second portions.

31. The rotatable lever as recited in claim 30, wherein the first portion and second portion include a cam surface.

32. The rotatable lever as recited in claim 31, wherein each guide is tapered.

33. The rotatable lever as recited in claim 29, wherein the rotatable lever is configured to rotate inside the chassis.

* * * * *

UNITED STATES PATENT AND TRADEMARK OFFICE
CERTIFICATE OF CORRECTION

PATENT NO.        : 7,012,803 B1                                    Page 1 of 1
APPLICATION NO.   : 09/717555
DATED             : March 14, 2006
INVENTOR(S)       : Peter W. Austin et al.

It is certified that error appears in the above-identified patent and that said Letters Patent is hereby corrected as shown below:

In column 7, line 63, in Claim 19, after "first" delete "second".

Signed and Sealed this

Fourteenth Day of September, 2010

David J. Kappos
*Director of the United States Patent and Trademark Office*